United States Patent [19]

Bahr et al.

[11] 4,362,843

[45] Dec. 7, 1982

[54] PROCESS FOR PRODUCING A POLYMERIZED, HEAT-RESISTANT LACQUER

[75] Inventors: Dietrich J. Bahr, Herrenberg; Marian Briska, Böblingen; Klaus Schackert, Herrenberg, all of Fed. Rep. of Germany

[73] Assignee: International Business Machines Corporation, Armonk, N.Y.

[21] Appl. No.: 262,251

[22] Filed: May 11, 1981

[30] Foreign Application Priority Data

Aug. 2, 1980 [DE] Fed. Rep. of Germany ....... 3029428

[51] Int. Cl.$^3$ .......................... C09D 3/14; C09D 3/76; B41M 5/24; G01D 15/34
[52] U.S. Cl. .................. 525/54.23; 523/200; 524/59; 524/68; 524/524; 524/576; 525/54.42; 525/54.44; 527/311; 527/313

[58] Field of Search ................. 260/17.4 R, 17.4 GC, 260/17.4 UC, 17.4 CL, 23 CP, 23 H, 27 EV, 28.5 A, 42.21, 42.25, 42.42; 204/14 N, 129.85; 523/200; 524/59, 68, 524, 576; 525/54.23, 54.42, 54.44; 527/311, 313

[56]     References Cited
U.S. PATENT DOCUMENTS 2,787,602  4/1957  Groves ....................... 260/17.4 CL
3,645,939  2/1972  Gaylord ..................... 260/17.4 GC Primary Examiner—John Kight, III
Assistant Examiner—Nathan M. Nutter
Attorney, Agent, or Firm—Joseph G. Walsh

[57]            ABSTRACT

After having been pretreated by kneading at its softening temperature, a cellulose acetate is subjected to block polymerization by being kneaded with, for example, an ethylene vinyl acetate copolymerizate, at its mean softening temperature. If necessary, the block copolymerizate may be subsequently cross-linked by adding a peroxide.

10 Claims, No Drawings

PROCESS FOR PRODUCING A POLYMERIZED, HEAT-RESISTANT LACQUER

DESCRIPTION

1. Technical Field

The invention concerns a novel process for producing a polymerized, heat-resistant, cellulose acetate based lacquer with a high carbon black compatibility and a high pigment absorption for record carriers coated with aluminum, as are used, for example, for electroerosion printers.

2. Background Art

For coating record carriers, both nitrocellulose lacquers and cellulose acetate lacquers have been used so far. Nitrocellulose lacquers have proved to be little temperature-resistant leading to the print electrodes being covered with a tough to firm cake of combustion products, such as lacquer pyrolizate, moisture, and dust, so that they failed after some time. In the presence of such hard pigments in the lacquer, it is also possible for the lacquer to be subject to automatic erosion in the area of the pigment grains, so that the latter are torn from the lacquer film, rolling under the print electrodes on the lacquer surface and interrupting the print process. Of the cellulose acetate lacquers only the following lacquers are suitable for such record carriers:

(a) Cellulose propionates

These lacquers have a moderate thermal stability with a relatively high softening point of about 200° C. to 220° C. but a poor carbon black compatibility and a low filler absorption, thus being little suited for pigmentation.

(b) Cellulose acetate butyrates

Cellulose acetate butyrates (CAB) with a butyryl content of about 38 percent (dibutyrate) have a melting point of 160° C. to 180° C., a good carbon black and pigment compatibility and a good film elasticity.

Cellulose acetate butyrates with a butyryl content of 15 percent to 17 percent (monobutyrates) have a high thermal stability. An advantage is that the melting point and the decomposition point practically coincide (220° C. to 240° C.). However, as the molecular weight decreases, there is also a drop in the melting point of the monobutyrates. The disadvantage of this polymer is its poor adhesion to paper in conjunction with carbon black and its low pigment absorption.

Pure cellulose lacquers

These lacquers have the highest temperature resistance of the cellulose acetate lacquers and a melting and decomposition point of 240° C. However, as lacquers for record carriers, they are even less suited than the above-mentioned monobutyrates.

The brittleness of cellulose acetate lacquers can be reduced by the addition of plasticizers and by a low molecular weight, but this simultaneously leads to a reduction in their temperature resistance. Even the use of phosphoric acid esters which are not easily inflammable does not improve the temperature resistance of such lacquers. After differently long printing periods, all of these lacquers lead to the feared caking, i.e., the occurrence of hard layers on the print electrodes, as described above.

As for cellulose based lacquers, such lacquers are for technical and economic reasons superior to the other lacquers used for the production of record carriers.

DISCLOSURE OF THE INVENTION

It is the object of the invention to provide a high temperature resistant lacquer, which has a high carbon black compatibility and a high pigment absorption, and which also has a high elasticity and a good adhesion to paper and aluminum. Such a temperature-resistant polymer can be produced in accordance with the invention in that, initially, the higher melting polymer is homogenized by kneading at softening temperature, whereby the quantity of plasticizer is added is such that the mechanical energy of the kneading process is still transferred in full to the polymer and in that, subsequently, the lower melting polymer is added and this mixture is kneaded up to homogenization at about the mean softening temperature, and that the copolymerizate thus obtained in processed to form a lacquer, adding pigments, if required.

In this context the term "cellulose acetate" is intended to over all cellulose acetates on the one hand and cellulose acetate monobutyrates and cellulose acetate propionates on the other.

The procedure preferably adopted is such that solvent-free cellulose acetate and high-polymer solvent-free ethylene vinyl acetate copolymerizate are processed in a kneader by kneading at about the mean softening temperature to form a copolymerizate. It is particularly advantageous for the cellulose acetate/polyvinyl acetate copolymerizate thus obtained to be pigmented in a 5 percent to 20 percent solution in higher ketones or esters with 3 percent to 4 percent carbon black and, depending upon the degree of polymerization, to be mixed with 0.5 percent to 5 percent of a phosphoric acid ester as a plasticizer.

Because in this case radical polymerization is concerned, the actual polymerization process is initiated and kept going by kneading a mixture of 50 percent to 90 percent of the cellulose acetate with 50 percent to 10 percent of the polyvinyl acetate or of the ethylene vinyl acetate copolymerizate, whereby kneading tears the long molecule chains, thus producing the radicals necessary for polymerization. At temperatures above 95° block polymerization predominates but must not exceed a moderate degree to retain the positive lacquer characteristics, such as elasticity, good solubility, etc., and to raise the decomposition and melting temperature. The degree of subsequent crosslinkage is determined by the addition of peroxides.

Therefore, it is advantageous for the mean molecular weight of the copolymerizate to be reduced by further cold kneading or mastication to such a degree that the viscosity and solubility required and obtained.

From this polymer the actual lacquer is subsequently produced as follows. The cellulose acetate polyvinyl acetate copolymerizate and the copolymerizate obtained from the ethylene vinyl acetate copolymerizate, respectively, are each pigmented as a 5 percent to 20 percent solution in higher ketones or esters with 3 percent to 4 percent carbon black and, depending upon the degree of polymerization of the copolymerizate, are mixed with 0.5 percent to 5 percent of a phosphoric ester as a plasticizer. For this purpose, a phosphoric acid cresol ester is preferably used.

The electrode wear is at its lowest with purely carbon black pigmented lacquers.

With lacquers pigmented in another manner it is advantageous to retain at least 1 percent carbon black in the lacquer. For this purpose, about 5 percent to 20 percent of an inorganic pigment, e.g. calcium carbonate, can be added. To make up for the missing blackening and covering power of carbon black, several percent bitumen or coal tar pitch are preferably added. Black organic dyestuffs are also suitable for this purpose. Finally, it is pointed out that all details refer to the liquid finished lacquer.

The process in accordance with the invention will be described in detail below be means of several Examples carried out and the results obtained.

As starting materials the following polymers were used:

1. A cellulose acetate butyrate with a viscosity of a 20 percent solution in acetone ethanol 9:1 measured at 23° C. from 2500 to 4600 mPa.s and a butyryl content of 15 percent and a softening temperature of 220° C. as well as a molecular weight of about 40,000;

2. a cellulose acetate butyrate with a viscosity of 10,000 to 15,000 mPa.s, a butyryl content of 16.5 percent, a softening temperature of 240° C., and a molecular weight of about 55,000;

3. an ethylene vinyl acetate copolymerizate with a vinyl acetate content of 60 percent, a Mooney viscosity ML4 at 100° C. of 40±5;

4. an ethylene vinyl acetate copolymerizate with a vinyl acetate content of 70 percent and a Mooney viscosity ML4 at 100° C. of 60±5;

5. polyvinyl acetate with a viscosity of a 10 percent ethyl acetate solution of 700 mPa.s and a softening temperature of 200° C. as well as a molecular weight of 1,100,000.

With these materials the following Examples were carried out.

EXAMPLE NO. 1

To an oil-heated kneader with a capacity of 1 liter, 480 g of a cellulose monobutyrate were added in portions and heated up to the softening temperature of 220° C. At the same time, 60 g of a plasticizer were added in portions, taking care that the softness of the mixture is such that the mechanical energy of the kneader is still transferred to the polymer. Energy transfer is prevented when the quantity of plasticizer added or the temperature used for kneading is too high. This adversely affects the number of radicals which are required and available for subsequent block polymerization and which are obtained by tearing the molecule chains. The polymer was kneaded for about 15 minutes until the mass had a silky appearance and all grains or inhomogeneities had disappeared.

Subsequently, about 110 g of an ethylene vinyl acetate copolymer No. 4 were added and kneading continued for another 20 minutes until the copolymerizate obtained during that process was completely homogeneous. Tests have shown that the copolymerizate thus obtained is a block polymerizate. After 24 hours, the polymer product was dissolved in ethyl acetate (10 percent solution) and left for two days. During that time the unreacted polymer parts collected at the top as a turbid layer. The clear, pure copolymer solution was drained off, mixed with 3 percent carbon black and 5 percent $CaCO_3$, and processed by means of a stirrer to form a lacquer. A comparison with a pure cellulose acetate butyrate lacquer showed a noticeably reduced shrinkage of the new lacquer, which, among other characteristics, is indicative of an improved pigment compatibility. Adhesion was improved, too. The new polymer has also a much higher hardness.

EXAMPLE NO. 2

This example was carried out in the same manner as Example 1. The cellulose acetate butyrate No. 2 was homogenized in a kneader at 240° C. and mixed with 110 g polyvinyl acetate of the starting material No. 5. The total kneading period was 45 minutes. Then the mixture was cooled to about 115° C., and kneading continued until a coarse-grained granular material had been obtained. The pure copolymer has a high hardness, a good solubility in ethyl acetate, and good film forming properties. The lacquer produced therefrom has a very good adhesion to paper and very little shrinkage even without the addition of a plasticizer.

EXAMPLE NO. 3

560 g of the starting material No. 2 were homogenized by kneading at 240° C. and mixed with 110 g of the starting material No. 3, and copolymerized in accordance with the same process as in Example 1. After about 45 minutes keading was completed.

During this test only very little copolymer was obtained after dissolution in ethyl acetate after 48 hours. A longer reaction period would lead to a higher yield, particularly when the subsequent cross-linkage is effected by means of a sufficiently temperature stable (200°–220° C.) organic peroxide. It is also possible to obtain a higher yield by adding the starting polymers at a ratio of 1:1 and by subsequently separating the unreacted parts.

All copolymers thus produced are at least 20° C. to 30° C. more temperature-resistant than previously used cellulose acetate butyrates and have a much higher hardness, a substantially improved carbon black compatibility, and a far higher pigment absorption than previously known cellulose acetate butyrates.

We claim:

1. A process for producing a polymerized, heat-resistant, cellulose acetate based lacquer of a high carbon black compatibility and a high pigment absorption, preferably for record carriers coated with aluminum, characterized in that:

initially, a higher melting polymer is homogenized by kneading at about softening temperature, whereby the quantity of plasticizer added is such that the mechanical energy of the kneading process is still transferred to the polymer, in that subsequently, a lower melting polymer is added and this mixture is kneaded up to homogenization at about the means softening temperature, and in that the copolymerizate thus obtained is processed to form a lacquer, adding pigments when desired.

2. A process in accordance with claim 1, characterized in that the solvent-free cellulose acetate and high-polymer solvent-free ethylene vinyl acetate copolymerizate are processed in a kneader by kneading at about the mean softening temperature to form a copolymerizate.

3. A process in accordance with claim 2, characterized in that subsequent cross-linkage, when desired, can be effected by means of a peroxide stable at the kneading temperature, whereby the extent of the subsequent cross-linkage is determined by the quantity of peroxide added.

4. A process in accordance with claim 1, characterized in that powdery or granular cellulose acetate is mixed with polyvinyl acetate, which is also powdery or granular, or with a powdery or granular ethylene vinyl acetate copolymerizate, by kneading to form a copolymerizate.

5. A process in accordance with claim 4, characterized in that polymerization is initiated and kept going by kneading a mixture of 50 percent to 90 percent of the cellulose acetate with 50 percent to 10 percent of the polyvinyl acetate or of the ethylene vinyl acetate copolymerizate.

6. A process in accordance with claim 1, characterized in that the cellulose acetate polyvinyl acetate copolymerizate thus obtained by partial block polymerization is pigmented in a 5 percent to 20 percent solution in higher ketones or esters with 3 percent to 4 percent carbon black and, depending upon the degree of polymerization, is mixed with 0.5 percent to 5 percent of a phosphoric ester as a plasticizer.

7. A process in accordance with claim 4, characterized in that a phosphoric acid cresol ester is used as the plasticizer.

8. A process in accordance with claim 4, characterized in that bitumen or coal tar pitch is added to the lacquer for blackening.

9. A process in accordance with claim 8, characterized in that at least 1 percent carbon black is added to the lacquer thus pigmented.

10. A process in accordance with claim 8, characterized in that about 5 percent to 20 percent of an inorganic pigment, such as calcium carbonate, are added to the lacquer thus pigmented.

* * * * *